(12) United States Patent
Hacklberger et al.

(10) Patent No.: US 12,081,096 B2
(45) Date of Patent: Sep. 3, 2024

(54) ELECTRIC MACHINE HAVING A FLUID COOLING DEVICE

(71) Applicant: ZF FRIEDRICHSHAFEN AG, Friedrichshafen (DE)

(72) Inventors: Michael Hacklberger, Neuburg am Inn (DE); Sebastian Kornexl, Wegscheid (DE); Manfred Geier, Ruderting (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 442 days.

(21) Appl. No.: 17/291,230

(22) PCT Filed: Oct. 31, 2019

(86) PCT No.: PCT/EP2019/079925
§ 371 (c)(1),
(2) Date: May 4, 2021

(87) PCT Pub. No.: WO2020/094513
PCT Pub. Date: May 14, 2020

(65) Prior Publication Data
US 2021/0376685 A1 Dec. 2, 2021

(30) Foreign Application Priority Data
Nov. 5, 2018 (DE) ...................... 10 2018 218 815.7

(51) Int. Cl.
*H02K 1/32* (2006.01)
*H02K 5/173* (2006.01)
(Continued)

(52) U.S. Cl.
CPC ........... *H02K 5/1732* (2013.01); *H02K 5/203* (2021.01); *H02K 9/193* (2013.01)

(58) Field of Classification Search
CPC H02K 1/32; H02K 5/20; H02K 5/203; H02K 9/19; H02K 9/193; H02K 9/197; H02K 5/1732; H02K 7/083
(Continued)

(56) References Cited

U.S. PATENT DOCUMENTS 3,060,335 A * 10/1962 Greenwald ............ H02K 5/203
310/58
2009/0127954 A1 * 5/2009 Mogi ................... F16H 57/0476
310/90
(Continued)

FOREIGN PATENT DOCUMENTS

| CN | 206237252 | 6/2017 |
|---|---|---|
| CN | 108462318 | 8/2018 |

(Continued)

OTHER PUBLICATIONS

Office Action dated Aug. 31, 2023, issued in Chinese Patent Application No. 2019800710393.

*Primary Examiner* — Michael Andrews
(74) *Attorney, Agent, or Firm* — Cozen O'Connor

(57) ABSTRACT

An electric machine with a stator, a rotor, and a fluid cooling device. The rotor is supported by a rotor shaft and a first bearing arranged at a bearing shield. The fluid cooling device has a cooling tube secured to a carrier element in fluidic communication with a fluid input and output and extends inside a recess of the rotor shaft while forming an annular space. A sealing element is provided between the rotor shaft and the carrier element, which prevents fluid passage into a spatial region of the electric machine outside of the sealing region. A second bearing is axially spaced apart from the first bearing is between the rotor shaft and a second bearing shield for supporting the rotor. The rotor core extends in a space between the first bearing and second (Continued)

bearing, and the recess extends inside the rotor shaft axially to the second bearing.

4 Claims, 4 Drawing Sheets

(51) Int. Cl.
    *H02K 5/20*     (2006.01)
    *H02K 9/193*     (2006.01)
    *H02K 9/197*     (2006.01)

(58) Field of Classification Search
    USPC .......................................... 310/52, 60 A, 61
    See application file for complete search history.

(56) References Cited

U.S. PATENT DOCUMENTS

| | | | | |
|---|---|---|---|---|
| 2010/0252236 | A1* | 10/2010 | Schneider | B23Q 11/127 |
| | | | | 165/104.19 |
| 2011/0298314 | A1* | 12/2011 | Atarashi | H02K 9/19 |
| | | | | 310/54 |
| 2018/0269743 | A1* | 9/2018 | Büttner | H02K 11/20 |
| 2020/0244123 | A1* | 7/2020 | Kang | H02K 9/19 |

FOREIGN PATENT DOCUMENTS

| | | |
|---|---|---|
| DE | 614536 | 6/1935 |
| DE | 19913199 | 10/2000 |
| JP | H0946973 | 2/1997 |
| WO | WO 2016050534 | 4/2016 |

* cited by examiner

US 12,081,096 B2

ELECTRIC MACHINE HAVING A FLUID COOLING DEVICE

CROSS REFERENCE TO RELATED APPLICATIONS

This is a U.S. national stage of Application No. PCT/EP2019/079925 filed Oct. 31, 2019. Priority is claimed on German Application No. DE 10 2018 218 815.7 filed Nov. 5, 2018 the content of which is incorporated herein by reference.

BACKGROUND OF THE INVENTION

1 Field of the Invention

The disclosure is directed to an electric machine with a fluid cooling device.

2. Description of Related Art

As disclosed in WO 2016/050534 A1, to cool the rotor in the electric machine described therein, a cooling tube is inserted axially into a rotor shaft, portions of which are formed as a hollow shaft. A cooling fluid flows through this cooling tube in an annular space provided between the cooling tube and the rotor shaft and can absorb lost heat of the rotor. The coolant can flow in and out on the same front side of the electric machine so that only a sealing element is required between the rotating rotor and the elements of the machine which are stationary relative to the rotor.

SUMMARY OF THE INVENTION

It is the object of one aspect of the invention to improve a generic electric machine having a fluid cooling device.

An electric machine with a fluid cooling device is suggested within the framework of one aspect of the present invention, this electric machine comprises a stator with a stator core, a stator winding, a rotor with a rotor core supported so as to be rotatable relative to the stator around an axis by a rotor shaft, and a first bearing arranged at a first bearing shield. The fluid cooling device has a cooling tube secured to a carrier element of the electric machine, this carrier element being fixed with respect to the stator, and which cooling tube communicates with a fluid input and extends axially inside of a central recess of the rotor shaft while forming an annular space with respect to the rotor shaft. The cooling tube is simultaneously in fluidic communication with the annular space and with a fluid output. Further, a sealing region with a sealing element is provided between the rotor shaft and the carrier element, which sealing element at least substantially prevents passage of fluid into a spatial region of the electric machine located outside of the sealing region when a cooling fluid flows through from the fluid input to the fluid output.

According to one aspect of the invention, it is provided in the electric machine for supporting the rotor that a second bearing, which is axially spaced apart from the first bearing, is provided between the rotor shaft and a second bearing shield, the rotor core extending in a space between the first bearing and second bearing, and the central recess extending inside the rotor shaft axially at least to the second bearing.

By the suggested construction of the fluid cooling device, the bearing arrangement of the electric machine with the first bearing and the second bearing can be completely cooled by the cooling fluid circulating inside of the rotor shaft. The heat loss generated at these bearings during operation of the electric machine can be transferred directly through heat conduction via the respective radially inner bearing ring to the rotor shaft and from the latter inside the second recess to the flowing cooling fluid. The central recess can preferably extend through the second bearing so that cooling of a portion of the rotor shaft axially remote of the rotor and of the electric machine can be improved.

Heat exchange can be improved in that the cooling tube extends within the rotor shaft axially at least up to and, if necessary, even past the second bearing. Accordingly, the region of the rotor shaft supporting the second bearing is likewise subject to laminar incident flow of the cooling fluid. Therefore, this region is located outside of a region with a turbulent flow such as can occur in the axial end region of the central recess, i.e., at the reversal point of the fluid flow in the rotor shaft. In such a region, the heat exchange between cooling fluid and rotor shaft can be reduced compared to the region mentioned above.

According to an advantageous embodiment, an inner diameter of the rotor shaft can be larger in the region of an axial extension of the rotor core and in the region of the second bearing than in the region of the first bearing. A correspondingly increased heat flow can be generated as a result of the enlarged inner circumferential area of the rotor shaft with an adapted volume flow of the cooling fluid. This means that the electric machine can operate at a lower operating temperature and can be protected against excessive heating. On the other hand, an increased continuous power is also made possible in this way.

Optionally, the rotor shaft can have a shaft portion with an output element, which shaft portion projects axially beyond the second bearing, and the central recess of the rotor shaft axially extends into the region of the output element, and cooling fluid flows through this central recess. Additionally, the cooling tube can likewise extend axially into the above-mentioned region. The output element and, therefore, further elements in a heat exchanging relationship and/or a lubricant or coolant located external to the rotor shaft can accordingly arrive and be cooled in the operative region of the fluid device. For example, the output element may belong to a transmission so that the further elements of the transmission can likewise give off generated heat loss via the rotor shaft.

According to yet another embodiment, the output element can be arranged at the rotor shaft axially between the second bearing and a third bearing, and the central recess of the rotor shaft extends axially into the region of the third bearing, and the cooling fluid flows through this central recess. In this regard, the cooling tube can also extend to the third bearing or through the latter.

BRIEF DESCRIPTION OF THE DRAWINGS

The invention will be described more fully in the following referring to an exemplary embodiment form shown in the figures.

The drawings show.

DETAILED DESCRIPTION OF THE PRESENTLY PREFERRED EMBODIMENTS

The figures show an electric machine 1 configured in particular for driving an electric vehicle or hybrid vehicle. In particular, the electric machine 1 is provided for installation in or on a vehicle axle and accordingly, in combination with further components, constitutes an electric axle drive 2. The electric machine 1 accordingly transmits its power to vehicle wheels for moving the vehicle. Besides the electric machine 1, which is described in more detail in the following, an electric vehicle drive and a vehicle with such an electric machine 1 are also described.

Figure 1:
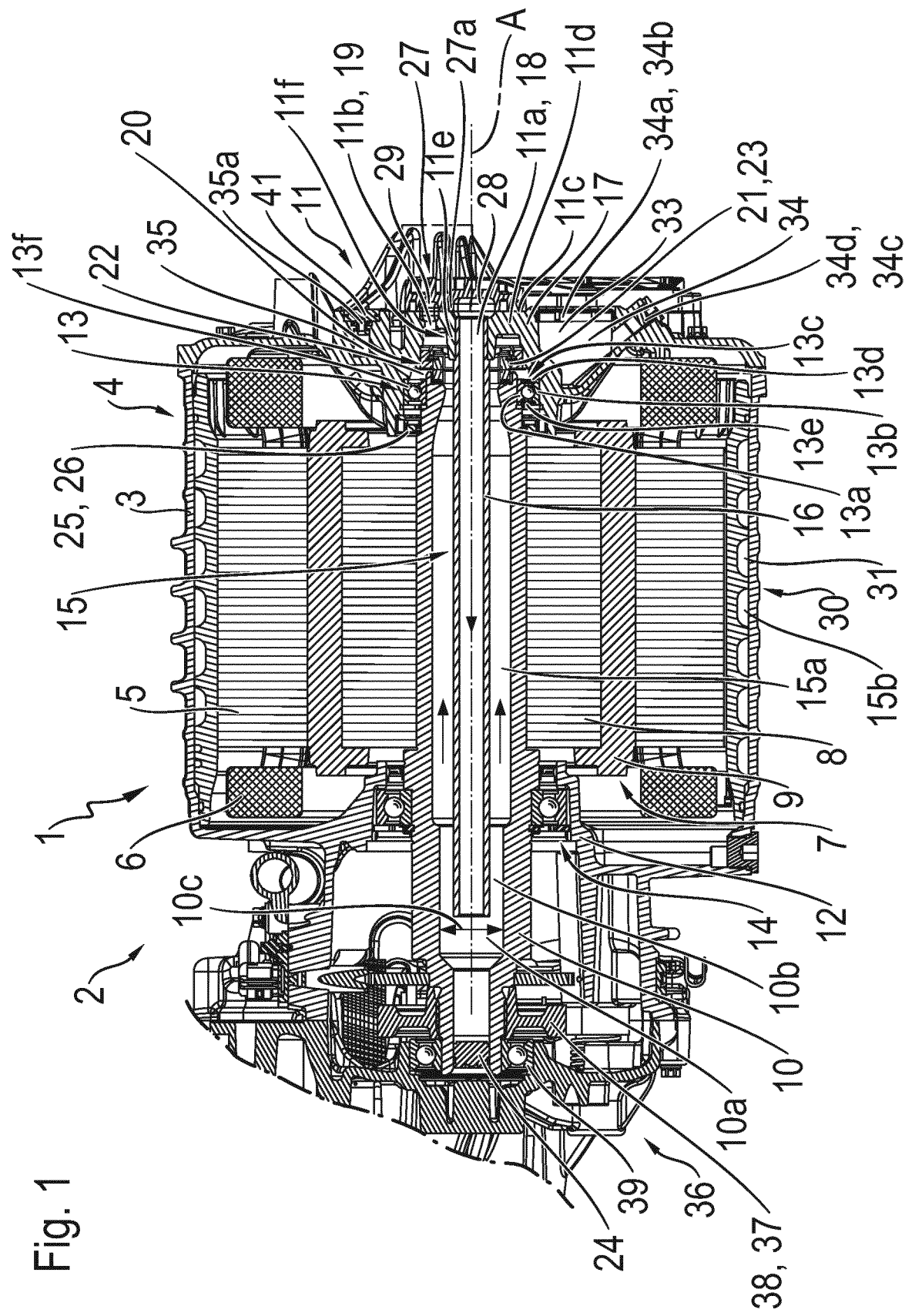
FIG. 1 is an electric machine formed as vehicle axle drive with a fluid cooling device in an axial sectional view.
Figure 2:
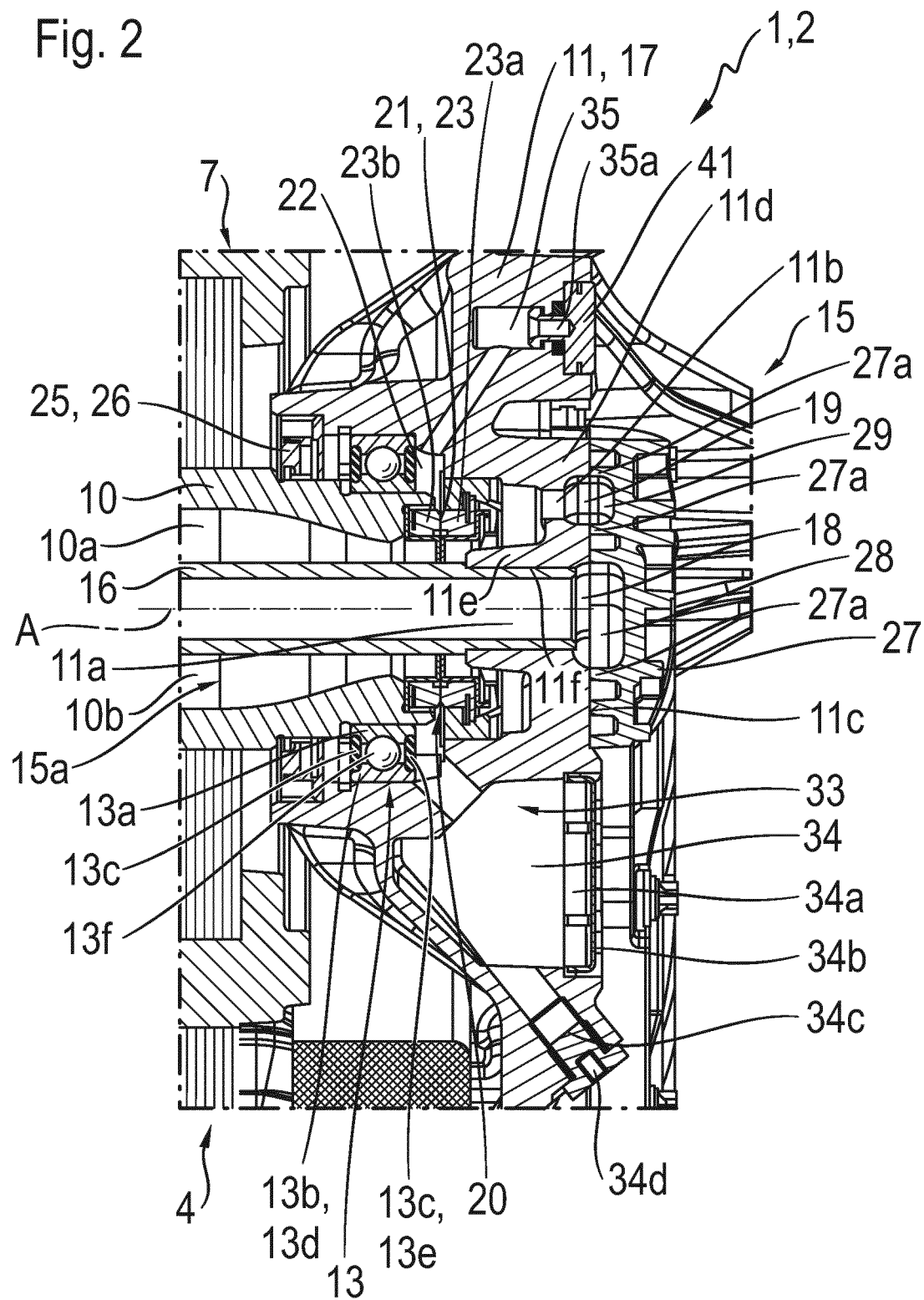
FIG. 2 is an enlarged section of the fluid cooling device from FIG. 1 in the region of a bearing shield of the electric machine.
Figure 3:
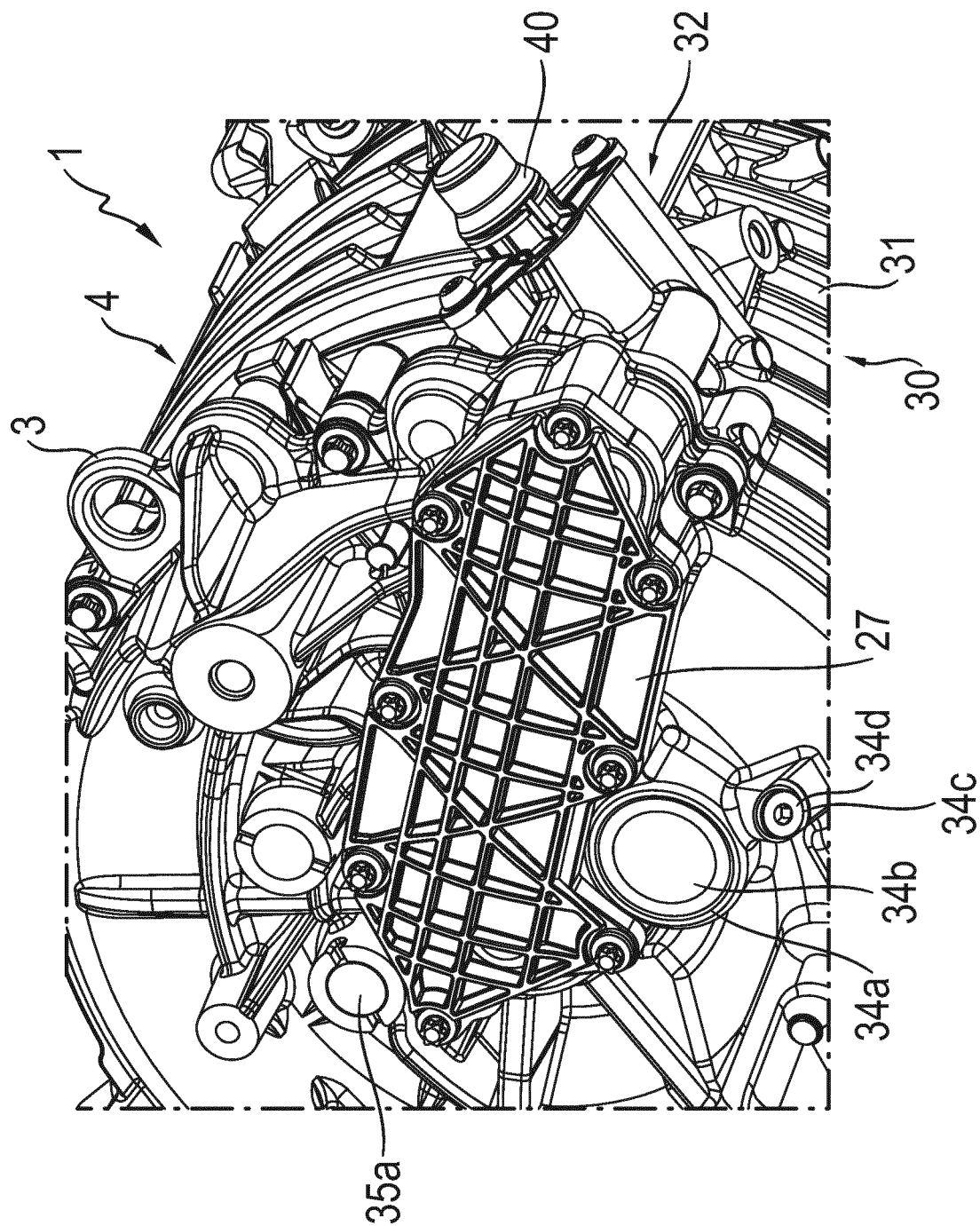
FIG. 3 is a perspective view of the electric machine in the region of the bearing shield of FIG. 3.
Figure 4:
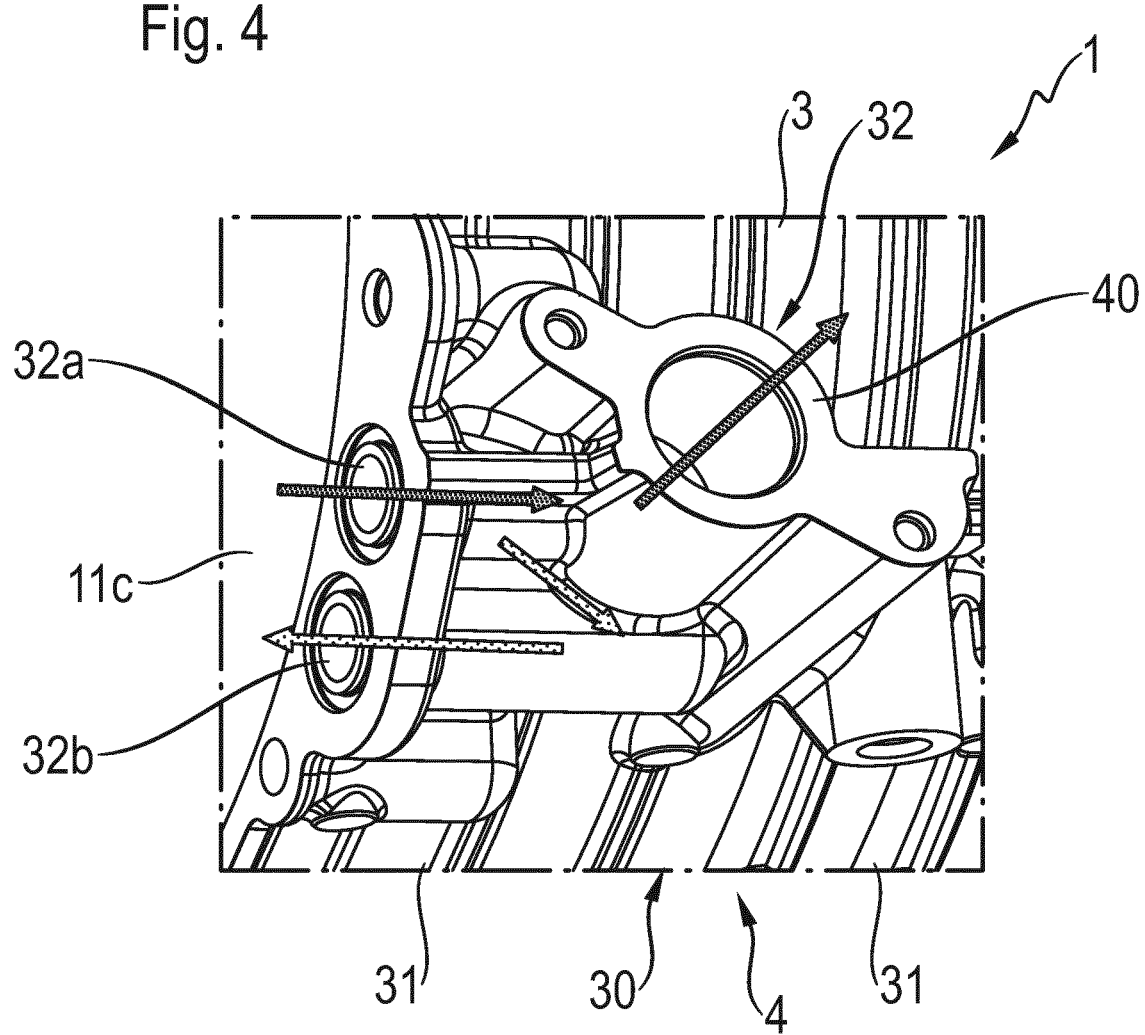
FIG. 4 a perspective view of a coolant flange formed at a housing of the electric machine.

The electric machine 1 comprises a stator 4 which is secured in a housing 3, with a stator core 5, a stator winding 6, a rotor 7 with a rotor core 8, and a squirrel cage 9. Accordingly, the electric machine 1 is formed as an asynchronous machine. The rotor 7 is supported so as to be rotatable around an axis A relative to the stator 4 by a rotor shaft 10, a first bearing 13 arranged at a first bearing shield 11 and a second bearing 14 arranged at a second bearing shield 12. The rotor shaft 10 is operatively connected to a transmission 36, shown at left in FIG. 1, which can transmit the engine torque to vehicle wheels via further transmission members, not shown.

The electric machine 1 has a fluid cooling device 15 through which a cooling fluid can flow and which can transfer received heat losses to a heat exchanger located externally of the electric machine 1.

The fluid cooling device 15 comprises a cooling tube 16 which is secured to a carrier element 17 fixed with respect to the stator, particularly to the first bearing shield 11, and which communicates with a fluid input 18 provided at the bearing shield 11. The cooling tube 16 is axially supported only on one side by the bearing shield 11 and extends over most of its length freely in axial direction within a central recess 10a of the rotor shaft 10 and forms an annular space 10b relative to the rotor shaft 10. The cooling tube 16 is axially open at both sides and is accordingly simultaneously in fluidic communication with the annular space 10b and with a fluid output 19, which is also provided at the first bearing shield 11. The first bearing shield 11 has a central first through-opening 11a to form the first fluid input 18, and a second through-opening 11b arranged radial to the first through-opening to form the fluid output 19. Accordingly, the two through-openings 11a, b exit the bearing shield 11 at a front mounting surface 11c remote of the rotor 7.

A sealing region 20 with a sealing element 21 is provided between the rotor shaft 10 and the bearing shield 11 functioning as carrier element 17. The sealing element 21 is tasked with at least substantially preventing fluid from passing into a spatial region 22 of the electric machine 1 located outside of the sealing region 20 when cooling fluid flows through from the fluid input 18 to the fluid output 19.

In the present instance, the sealing element 21 is an axial end-face mechanical seal 23. The end-face mechanical seal 23 comprises a first portion 23a which is secured to the carrier element 17 and further comprises a second portion 23b which is secured to the rotor shaft 10 and which is in sealing communication with the first portion 23a. The second portion 23b of the end-face mechanical seal 23 is arranged so as to at least partially axially overlap the first bearing 13.

Further, the first bearing 13 has, at the axial side facing the end-face mechanical seal 23 and also at the axial side facing the rotor core 8, a seal arrangement 13c with two sealing disks 13d, 13e which acts between a radially inner bearing ring 13a and a radially outer bearing ring 13b. The bearing interior 13f is sealed by means of a high-speed grease against penetration of cooling fluid. Accordingly, on the one hand, the bearing 13 is lubricated and, on the other hand, fluid is prevented from penetrating into the inner spatial region 22 of the electric machine 1 by the provided grease barrier.

An inner diameter 10c of the rotor shaft 10 or of the central recess 10a provided therein can be formed larger in the region of an axial extension of the rotor core 8 than in the region of the first bearing 13 for purposes of a noticeable increase in the fluid-cooled inner circumferential surface area of the rotor shaft 10 and, therefore, for purposes of further improving the cooling effect.

As can be seen, the rotor shaft 10 is formed as a hollow shaft and is sealed fluid-tight by a closure 24 at the axial side remote of the fluid input 18. Through the coaxial arrangement of the rotor shaft 10 and cooling tube 16, the fluid flow undergoes a reversal of direction opposite the flow in-direction and can flow out again on the axial side of the fluid input 18, for which purpose a seal arrangement in the form of the sealing element 21 is required only on this side.

Accordingly, the cooling tube 16, the first bearing 13 and the portion 23a of the sealing element 23, which is fixed with respect to the stator are received by the first bearing shield 11.

The first bearing shield 11 further receives an electric equipotential bonding element 25 cooperating with the rotor shaft 10. In the present case, a slip ring arrangement 26 is provided as equipotential bonding element 25 and reduces differences of potential between the stator 4 and the rotor 7 occurring as ripple voltages through electrical short circuiting. The equipotential bonding element 25 is arranged axially adjacent to the first bearing 13, particularly axially between the bearing 13 and the rotor core 8.

The cooling tube 16 is fixed to a fastening region 11f provided at the bearing shield 11 or, generally, at the carrier element 17. In particular, the cooling tube 16 is arranged by an interference fit in an axial projection 11e protruding from a base body 11d of the bearing shield 11, this axial projection 11e forming the fastening region 11f. It will be seen from the figures that the fastening region 11f axially partially overlaps the portion 23a of the sealing element 21 or end-face mechanical seal 23 that is fixed with respect to the stator.

Coming back to the mounting surface 11c, a cover element 27 comprising a plastic with a peg arrangement 27a is arranged at the latter so as to be tight against fluid. In so doing, a fluid inlet channel 28 and a fluid outlet channel 29 are formed by the peg arrangement 27a between the bearing shield 11 and the cover element 27 and/or in the cover element 27.

The housing 3 of the electric machine 1 is formed as a cast part from a light metal material, in the present case, an aluminum material. The housing 3 simultaneously forms a fluid cooling jacket 30 with a fluid channel arrangement 31, the stator 4 being outwardly surrounded by the fluid cooling jacket 30. The housing 3 has, on the side facing the first bearing shield 11, a coolant flange 32, which is formed integral therewith and which has two fluid channel portions 32a, b in fluid communication with the fluid inlet channel 28 and the fluid outlet channel 29 of the cover element 27. The fluid channel portion 32a forms an external coolant connection 40. A further external coolant connection, not shown, can be arranged, for example, at another position of the stator cooling jacket or at power electronics for controlling the electric machine 1, the power electronics being connected by the housing and cooling circuit thereof to the electric machine 1 and to the fluid cooling device 15 formed at the latter. The further fluid channel portion 32b, on the other hand, forms a connection channel to the fluid cooling jacket 30 of the stator 4. The fluid cooling device 15 can accordingly have a cooling portion 15a for cooling the rotor 7 and a cooling portion 15b for cooling the stator 4. The cooling fluid flows successively through the cooling portions 15a, 15b, and a fluid connection provided therebetween is formed as a stationary, tubeless connection channel 32b.

A leakage space 33 with a fluid collecting region 34 is provided outside of the sealing element 21, i.e., at the side of the end-face mechanical seal 23 remote of the flowing cooling fluid. A portion of the cooling fluid passing through the sealing region 20 can enter this fluid collecting region 34 and be collected therein. The leakage space 33 further has a gas collecting region 35 arranged geodetically higher than the fluid collecting region 34 in an operating position of the electric machine 1. When using a cooling fluid with materially at least one volatile component, this volatile component can escape via the end-face mechanical seal 23 and collect in the gas collecting region 35.

Insofar as a component in the form of a solid is precipitated from the cooling fluid when the volatile component escapes, this solids component is likewise received by the fluid collecting region 34. A closable access aperture 34a with a removable closure cap 34b is provided at the fluid collection region 34 for removal of the solids component.

To remove a cooling fluid present in the fluid collecting region 34, a closable fluid drain opening 34c with a drain element 34d, particularly a drain screw or a drain plug, is provided at this fluid collecting region 34. In an operating position of the electric machine 1, the fluid drain opening 34c is oriented substantially geodetically downward and is arranged geodetically lower than a gas drain opening 35a of the gas collecting region 35. The access aperture of the closure cap 34b is formed with a larger cross section than the fluid drain opening 35a for easy removal of solids components.

The fluid drain opening 34c is provided at least approximately in a 6 o'clock position, i.e., approximately between a 5 o'clock position and a 7 o'clock position. On the other hand, the gas drain opening 35a is provided at least approximately in a 12 o'clock position, i.e., approximately between an 11 o'clock position and a 1 o'clock position. The fluid collecting region 34 and the gas collecting region 35 are provided at least approximately in the same axial position. Further, the end-face mechanical seal 23 can also be located at this axial position or can at least axially overlap the fluid collecting region 34 and/or the gas collecting region 35.

The gas drain opening 35a of the gas collecting region 35 further has a pressure equalization element 41, which allows gases to escape from the gas collecting region 35. The pressure equalization element 34 comprises a semipermeable membrane, which is permeable to air so as to allow a pressure equalization but does not allow fluid to pass through.

As has already been mentioned above, the second bearing 14, which can also be formed, if necessary, with sealing rings on one or both axial sides and with a lubricant filling is additionally provided at an axial distance from the first bearing 13 for supporting the rotor 7. The bearing 14 is provided radially between the rotor shaft 10 and the second bearing shield 12. The rotor core 8 extends in an axial space between the first bearing 11 and second bearing 12. As can be seen, the central recess 10a extends inside of the rotor shaft 10 axially through the second bearing 14 for the purpose of improving cooling. The cooling tube 16 likewise extends within the rotor shaft 10 axially beyond the second bearing 12. As can further be seen, the inner diameter of the rotor shaft 10 in the region of the axial extension of the rotor core 8 and in the region of the second bearing 12 is larger than in the region of the first bearing 11.

In the above-mentioned embodiment example, the rotor shaft 10 has a shaft portion with an output element 38 formed as toothed wheel 37, which shaft portion projects axially beyond the second bearing 12 and leads into the transmission 36. The central recess 10a of the rotor shaft 10 extends axially into the region of the output element 38 and cooling fluid can therefore also flow through it. According to a modification of the arrangement, the cooling tube 16 can also extend axially into the above-mentioned region. The output element 38 and, therefore, further elements in a heat exchanging relationship and/or a lubricant or coolant located externally of the rotor shaft 10 can therefore likewise arrive in the operative region of the fluid cooling device 15 and be cooled.

As will further be seen from the figures, the output element 38 is arranged at the rotor shaft 10 axially between the second bearing 14 and a third bearing 39. The central recess 10a of the rotor shaft 10 reaches axially into the region of the third bearing 39, and cooling fluid accordingly flows through it up to this position. The third bearing 39 is accordingly also located in the operative region of the above-described fluid cooling device 15.

In the preceding description, designations of functional elements have been chosen in part with reference to a fixed flow direction. The flow direction of the cooling fluid within the fluid cooling device in the above-described electric machine is reversible in principle. When the flow direction is reversed, the functional elements designated with reference to the flow direction adopt a correspondingly opposite meaning. For example, the portion or area designated as fluid input now forms the fluid output, and so on.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. An electric machine, comprising:
a stator with a stator core and a stator winding;
a carrier element of the electric machine fixed with respect to the stator;
a rotor shaft;
a first bearing arranged at a first bearing shield;

a rotor with a rotor core which is rotatably supported relative to the stator around an axis by the rotor shaft and the first bearing;

a fluid cooling device comprising:

a cooling tube which is secured to the carrier element and which communicates with a fluid input and extends axially inside of a central recess of the rotor shaft while forming an annular space with respect to the rotor shaft, wherein the cooling tube is in fluidic communication with the annular space and with a fluid output;

a sealing region with a sealing element provided between the rotor shaft and the carrier element, which at least substantially prevents a passage of fluid into a spatial region of the electric machine located outside of the sealing region when a cooling fluid flows through from the fluid input to the fluid output; and a second bearing, which is axially spaced apart from the first bearing, is provided between the rotor shaft and a second bearing shield for supporting the rotor, wherein the rotor core extends in a space between the first bearing and second bearing, and wherein the central recess extends inside the rotor shaft axially at least to the second bearing, and wherein the rotor shaft has a shaft portion with an output element, the shaft portion projects axially beyond the second bearing, and wherein the central recess of the rotor shaft axially extends into a region radially bounded by the output element, and cooling fluid flows through an entire extent of the central recess including the region radially bounded by the output element, wherein the cooling fluid is fluidically separate from a lubricant or coolant located externally to the annular space with respect to the rotor shaft.

2. The electric machine according to claim 1, wherein the cooling tube extends within the rotor shaft axially at least to the second bearing.

3. The electric machine according to claim 1, wherein an inner diameter of the rotor shaft is larger in a region of an axial extension of the rotor core, and wherein an inner diameter of the rotor shaft is larger in the region of the second bearing than in the region of the first bearing.

4. The electric machine according to claim 1, further comprising:

a third bearing, wherein the output element is arranged at the rotor shaft axially between the second bearing and the third bearing, wherein the central recess of the rotor shaft extends axially into a region of the third bearing, and the cooling fluid flows through the central recess.

* * * * *